United States Patent [19]

Dean et al.

[11] 4,408,226

[45] Oct. 4, 1983

[54] TEST APPARATUS FOR MONITORING DIGITAL TRANSMISSIONS

[75] Inventors: Andrew Dean, Winnall; Peter R. Hutt, Petersfield, both of England

[73] Assignee: Independent Broadcasting Authority, London, England

[21] Appl. No.: 223,830

[22] Filed: Jan. 9, 1981

[30] Foreign Application Priority Data

Jan. 11, 1980 [GB] United Kingdom .................. 8001036

[51] Int. Cl.³ .............................................. H04N 5/13
[52] U.S. Cl. .................................... 358/139; 358/147
[58] Field of Search ................. 358/10, 139, 141, 142, 358/146, 147, 12; 375/3, 4, 24, 25, 26, 34; 371/30

[56] References Cited

U.S. PATENT DOCUMENTS

| | | | |
|---|---|---|---|
| 3,723,637 | 3/1973 | Fujio et al. ............................. | 358/12 |
| 4,204,228 | 5/1980 | Mason et al. ......................... | 358/139 |
| 4,242,755 | 12/1980 | Gauzan ............................. | 375/94 X |

FOREIGN PATENT DOCUMENTS 1313832 4/1973 United Kingdom .................. 358/13

Primary Examiner—Robert L. Richardson
Attorney, Agent, or Firm—Laubscher, Philpitt & Laubscher

[57] ABSTRACT

Test apparatus for monitoring transmissions contained in a broad band television video signal is disclosed including a sampling device operating at an integer multiple of the digital bit rate which is above the Nyguist level and a temporary storage device for storing the sample produced by the sampling device. A microprocessor is used to compute from the stored samples a value of a parameter of the digital transmission and to control the sampling device whereby the sample can be taken at appropriate points for the parameter to be tested. To that end, conversion means are provided for converting the stored samples so as to recreate the input digital transmission for resampling at the points determined by the microprocessor.

6 Claims, 5 Drawing Figures

TEST APPARATUS FOR MONITORING DIGITAL TRANSMISSIONS

BRIEF DESCRIPTION OF THE PRIOR ART

The present invention relates to the digital transmission and reception of information and more particularly to test apparatus therefor.

Digital transmission and reception of information is increasing in importance and particularly in television. One aspect of this is where information in digital form is transmitted during the field blanking time of a conventional video signal. This is called teletext and is in operation in Great Britian at the present time.

The co-pending U.K. Application No. 19609/77 discloses apparatus which can be used to provide a varying degree of distortion on a teletext data signal for testing decoders. While the apparatus can be used in some circumstances to test the quality of a teletext signal of unknown quality this is not its prime use.

SUMMARY OF THE INVENTION

It is an object of the present invention to provide apparatus which will accurately measure the quality of a teletext signal of unknown quality.

It is another object of the present invention to provide such apparatus which is digital in concept and which can thus be more susceptible to automatic monitoring and for control without an operator being present. Thus, if necessary, by adding telemetry equipment the apparatus can be operated from a central station without requiring manual operation.

The present invention provides apparatus for monitoring a digital data signal by digitally storing a portion of the signal and analyzing the stored signal.

Preferably a microprocessor is used to control the apparatus and this allows the stored portion of the data signal to be tested for a number of parameters.

BRIEF DESCRIPTION OF THE DRAWING

In order that the present invention be more readily understood, an embodiment thereof will be described by way of example with reference to the accompanying drawings, in which.

DETAILED DESCRIPTION

Teletext transmission in Great Britain is carried out $\frac{7}{8}$ Megabytes/sec of 8-bit words which in practice produces a data bit rate of approximately 7 Megabits/sec (6.9375 MHz).

The apparatus to be described samples the digital waveform at a frequency which is an integer multiple of the data bit rate advantageously at a rate above Nyquist level so that after sampling the original waveform can be accurately reconstructed. We have therefore chosen a sampling frequency of three times the data bit rate ($3 \times 7$ Megahertz) which given approximately 21 Megasamples/sec. We also prefer to use 8-bit words for the samples, rendering sufficient accuracy in this application.

Figure 1:
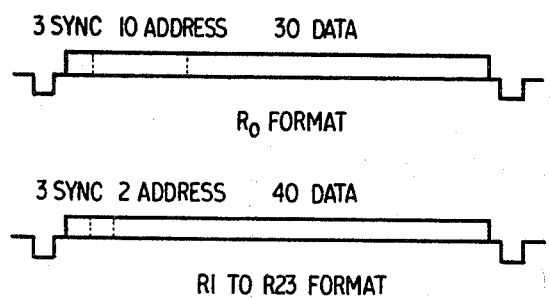
FIG. 1 shows U.K. teletext format.
Figure 2:
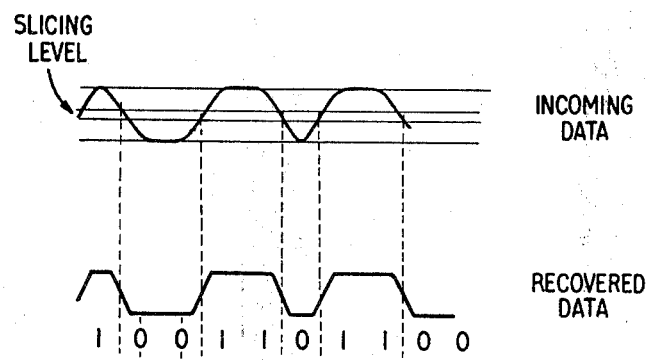
FIG. 2 shows a portion of the data signal.

From FIG. 1 it will be seen that the digital information is transmitted in packets of information with each packet marked by the normal line sync pulses. Further, from FIG. 2 it will be seen that the incoming data signal does not conform to a series of rectangular pulses, rather it looks like an analogue signal but when a particular slicing level is chosen it can be transferred into a digital signal. The apparatus to be described is arranged to sample the incoming data signal at approximately 21 Mega Hz and to store the samples.

A feature of teletext is that not all the available periods of a television signal are filled with data and so it is necessary for the apparatus to count line sync pulses so as to identify and sample the correct portion of the television signal. It is preferred to sample and store a portion of the television signal on either side of the data signal of interest to ensure that the whole video line including sync pulses is applied.

Figure 3:
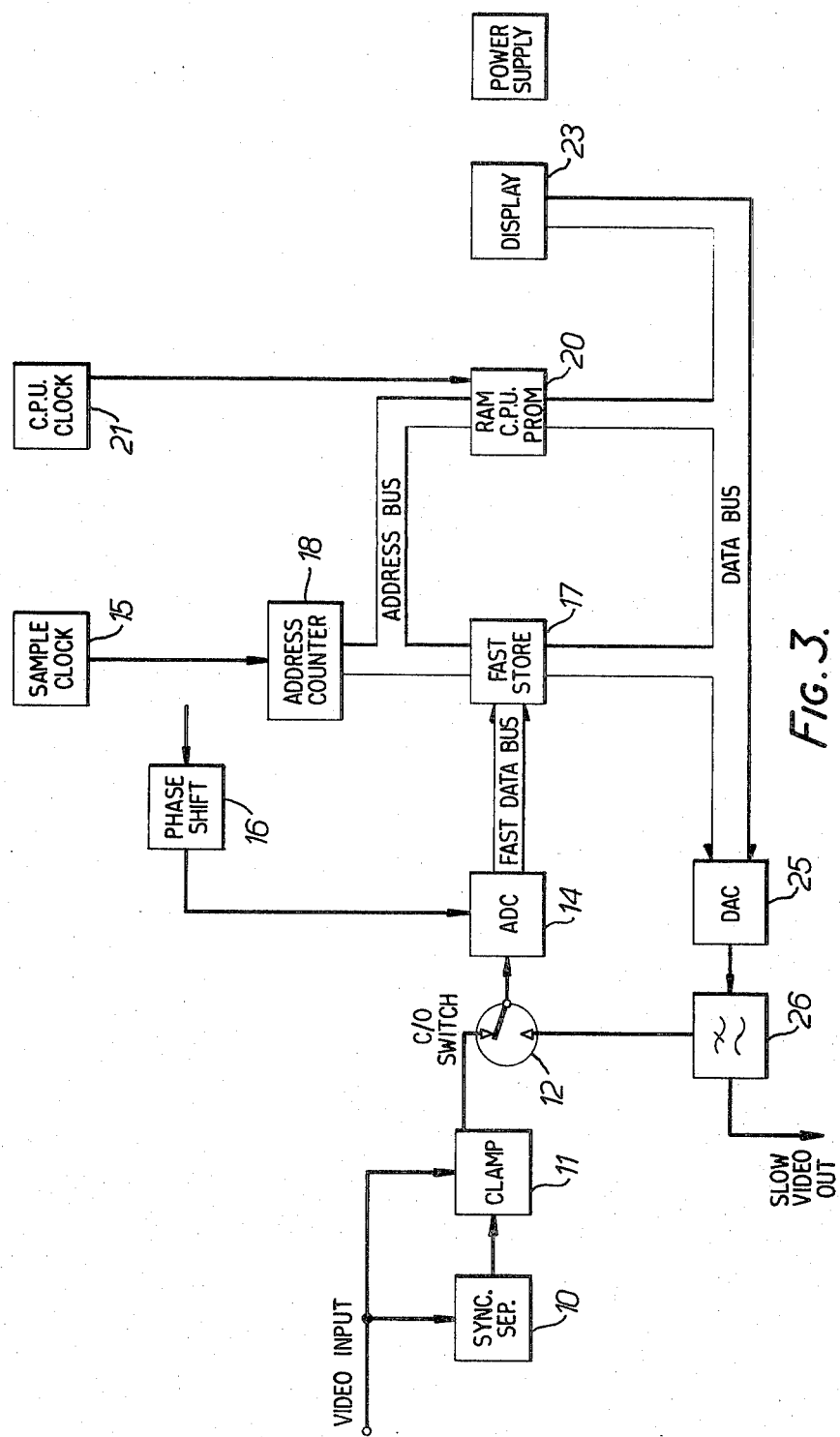
FIG. 3 shows a block diagram of apparatus according to the present invention.
Figure 4:
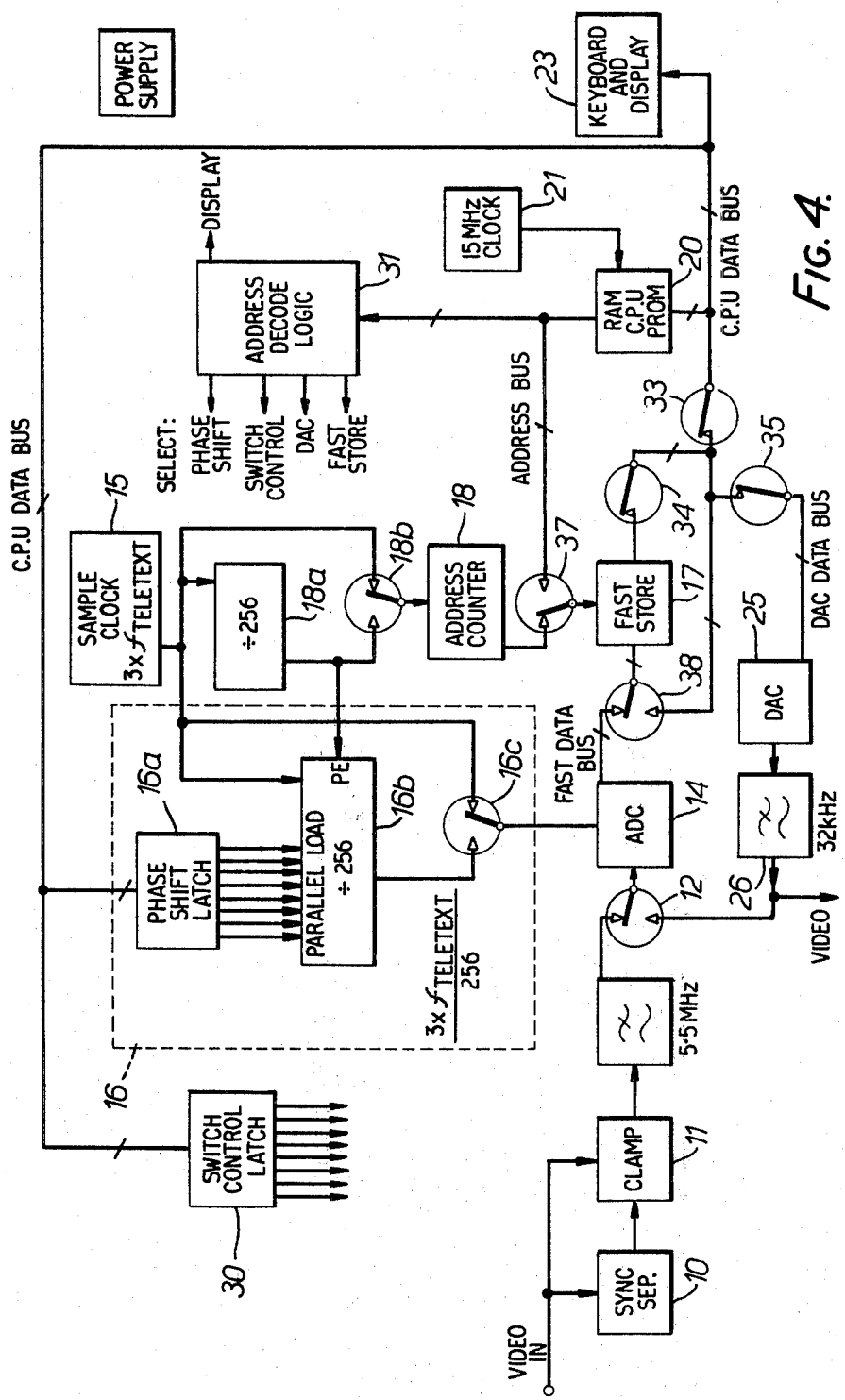
FIG. 4 shows a further block diagram of the embodiment showing the control paths.

Turning now to the embodiment of the invention diagrammatically shown in FIGS. 3 and 4 a video input is fed to a sync separator circuit 10 and to a clamp circuit 11 controlled by the circuit 10. The clamp circuit is fitted with a 5.5 MHz low pass video filter to band limit the incoming signal and its output is fed via a video change-over switch 12 to an analogue to digital converter 14 operating at 20.8 MHz under the control of a sample clock circuit 15 and a phase shift circuit 16, the purpose of which will become apparent later. The output from the converter 14 is a series of 8-bit words which are stored in a store 17 addressed by an address counter 18 driven by the clock circuit 15 or by the address bus of a microprocessor 20 driven by a clock circuit which in this case is a separate clock circuit 21 because the microprocessor cannot operate at 20.8 MHz.

The microprocessor is arranged to carry out one or more tests on the data stored in the store 17 and to display the result of this test on display unit 23.

A feature of the apparatus is that the data stored in the store 17 can be read out under the control of the processor 20, fed to a digital to analogue converter circuit 25, the output of which is fed via a low pass filter 26 back to another terminal of the change-over switch 12 also under the control of the processor 20 and hence back to the A/D converter 14 for further sampling at locations depending on the condition of the phase shift circuit 16.

In other words a digital representation of a portion of teletext is stored in the store 17. This can be used to reconstruct the original analogue data signal which is then resampled at points chosen by the microprocessor to be the most appropriate for the parameter to be monitored. This provides satisfactory results more quickly than does digital interpolation by the microprocessor, though such interpolation may be employed in the calculation of certain parameters.

How this is achieved is best understood by reference to FIG. 4 in which as far as possible the same reference numerals are used for the same parts. It will be noted among other things additional change-over switches are shown and that the interconnection between the sample clock circuit 15 and the address counter 18 is shown in more detail to include a divide by 256 circuit 18a and a change-over switch 18b. Also, the phase shift circuit 16 is shown in broken lines and comprises a phase shift latch 16a; a divide by 256 circuit 16b; and a change-over switch 16c. The change-over switches are controlled by the processor 20 by an output on the data bus which is fed to a switch control latch 30. An address decode logic circuit 31 determines which of the various circuit elements will be operating at any time depending on the parameter to be monitored or the function required by the processor.

Assume now that it is desired to monitor a particular parameter and samples of the waveform are being taken at positions which do not give the best results. This can arise since the sampling frequency is not phase-synchronized with the data in the period of the television line under consideration.

The logic circuit first operates to open switch 33 between the data bus of the processor 20 and the fast store 17; close change-over switch 34 at the output of the fast store 17; close switch 35 at the input to the A/D converter 25 and operate address change-over switches 37, the change-over switch 12 and a further change-over switch 38 between the A/D converter 14 and the fast store 17 so that information in the store can be read out by the address counter 18, converted by the converter 25, by the converter 14 and stored by the store 17.

The timing of the sampling is synchronized with the addressing of the store 17 by the latch 16a; to divide by 256 circuits 16b and 18a; the switch 16c and a further switch 18b between the clock circuit 15 and the address counter 18. The arrangement is that the switch 18b is opened to inhibit addressing of the store 17 and the phase shift latch 16a is loaded with a data word from the processor 20 indicative of the position which the processor has calculated will give the most appropriate sampling points during A/D conversion. The output of the latch 16a is used to pre-set the circuit 16b to a particular count. Thus, what is happending is that the addressing of the store to read out the data therein and the triggering of the A/D converter 14 are synchronized by the two divide by 256 circuits, the time at which samples are taken being altered by altering the pre-set conditions of the circuit 16b.

In this Example, the fast store is read out at a rate of 20.8 MHz divided by 256. Thus, the phase shift introduced by the circuits 16a and 16b allows a sampling position to be moved to one of 256 positions between existing sample points. The figure of 256 is a convenient one but it could be altered depending on the accuracy required.

Figure 5:
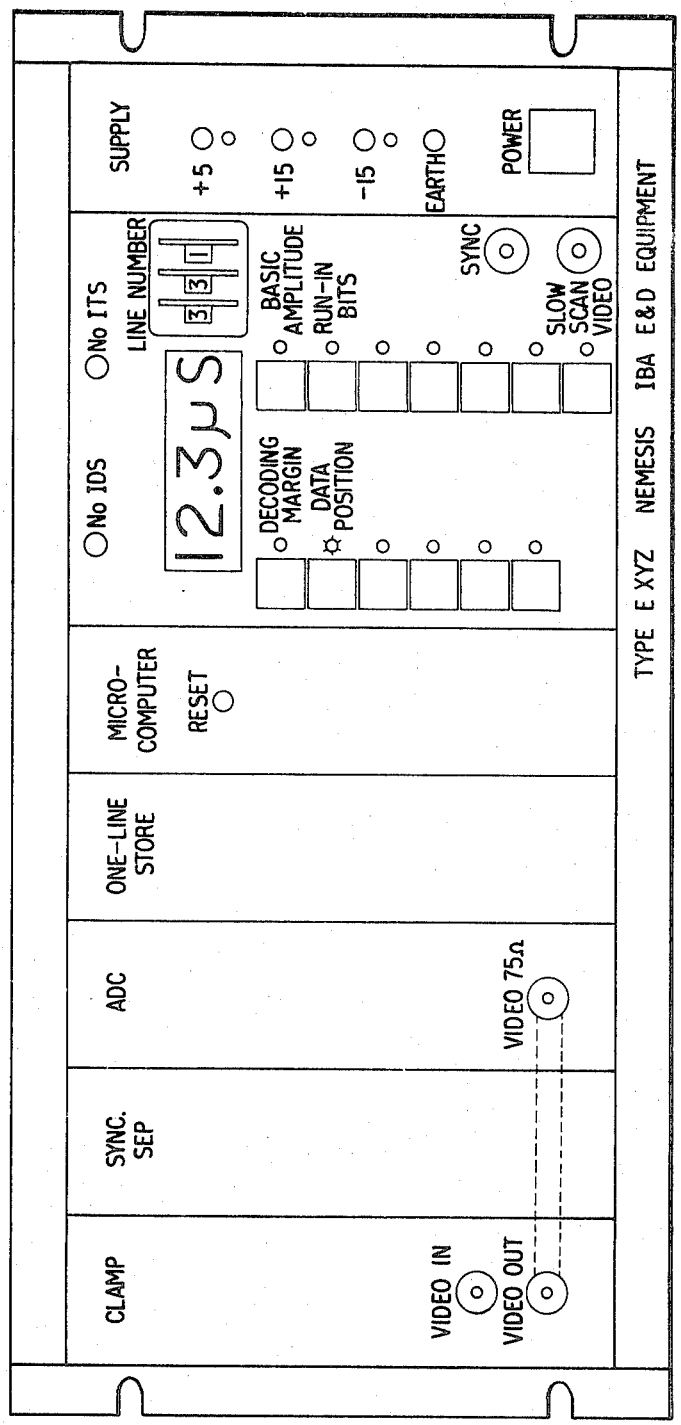
FIG. 5 shows the front panel of the apparatus which shows a push button for selecting the parameters to be monitored and thumb wheels for determining the line to be subjected to the monitoring operation.

It is apparent from the above that the store 17 may be addressed at a plurality of different rates e.g. at a rate of the clock circuit 15, or the rate of the microprocessor 20 which is lower than the clock circuit rate or the rate of the output of the divider circuit 18a which allows a video output of a single video line to be obtained which is of greater brightness than has hitherto been possible to obtain. This is FIG. 5 is termed "slow scan video".

The rate of 20.8 MHz divided by 256 is used for both the single video line read out and for phase shifting because in practice this has proved adequate In some circumstances it may prove desirable to alter rate for one or both of the above operations.

Further, telemetry equipment can be added to allow remote operation of the apparatus.

In order to appreciate the variety of parameters which can be monitored by this apparatus the following is a list of the parameters at present to be monitored.

| | |
|---|---|
| decoding margin | peak to peak amplitude |
| basic amplitude | video noise level |
| data position | teletext noise level |
| number of run-in pulses | zero crossing jitter |

The method by which the apparatus measures Decoding margin will now be described.

The instrument samples line 332 and in default line 19. The bar amplitude is derived as the difference in voltage between the average of the white-level samples and the black-level samples. The bar amplitude is used subsequently to normalize the result. In absence of an ITS the signal is assumed to be at standard level.

A data line is stored. The lowest 'one' and the highest zero at the nominal clocking points of the data line are stored. The difference between the two is divided by (0.66×the ITS bar amplitude) and displayed.

A second data line is stored. The lowest 'one' replaces the previous line's if lower and highest 'zero' replaces the previous line's if higher. The decoding margin is recalculated and displayed.

The process continues up to 6 data lines and the final reading is the required 1 in 1000 decoding margin. This result is used for telemetry.

If calculation rates prove fast enough several samples per data line can be stored, say 10, and a running register kept of the 10 worst ones and zeros occurring over a long sequence, in this case 58 data lines (or 10,000 bits). The final result is then ascertained from the difference between the 10th worst '1' and 10th worst '0'.

Another example would be to store the 5 worst ones and zeroes over 29 data lines. If more than one pulse value is stored, then the intermediate displays, as data lines are analyzed, need to be defined in relation to the number of lines so far contributing.

In any case the statistical invariance of the result improves as the speed of computation increases and hence the number of bits contributing to the '1' in a 1000' error criterion.

The apparatus described above was constructed using the following apparatus:

| | |
|---|---|
| DAC is Precision Monolithics. DAC-03 8-bit DAC with 9 bit accuracy. | |
| Filter = | 32 KHz low-pass filter with group delay correction and aperture correction for 82k samples per second. Must accurately reconstitute the original video waveform within the limits of the quantisation noise introduced by the ADC process. |
| Video Switch | Siliconix DG 180. Must provide good isolation when off with low distortion when on. |
| CPU Intel 8086 | 16-bit microprocessor with onboard EPROM and RAM. To run from 15 MHz Crystal. Processor provided 16-bit multiply and divide facility essential for calculating teletext parameter results. |
| Sync Separator | S221/1. IBA designated module. |
| Clamp. | S756. IBA designed module. Fitted with 5.5 MHz low pass video filter to band limit incoming signal. |
| Power supply | 24v AC in 5v @ 10A ⎫ ± 14v @ 2A ⎭ out |
| Display | Front Panel incorporates 5 × 7 dot matrix displays (Monsanto MAN 2A) lever handle C + K switches with |

-continued

| | DAC is Precision Monolithics. DAC-03 8-bit DAC with 9 bit accuracy. |
|---|---|
| | rectangular red LED indicators. Electronics - INTEL 8741 Universal Peripheral Controller. |
| Fast Store: | 2K bytes of Fairchild RAM type 93425 APC Addressed by 745161 counters through 745158 multiplexers. Store addressable by fast counter when cycle time is 48 μs or by C.P.U. capable of storing 1½ lines of video. |
| ADC board | TRW TDC 1007 J High Speed 8-bit ADC Minimum Maximum conversion rate = 20 MHz in specification Nominal Maximum conversion rate = 30 MHz |

We claim:

1. Apparatus for monitoring a digital waveform contained in a broad band television video signal, comprising
    (a) sampling means (14, 15) for sampling the digital waveform at first locations and at an integer multiple of the digital bit rate which is above the Nyguist level to produce output digital words indicative of the samples;
    (b) temporary storage means (17) for storing said output digital words;
    (c) analyzing means including a microprocessor (20) for producing from the output digital words stored in said storage means a value of a given parameter of the digital waveform;
    (d) display means (23) for displaying said value;
    (e) conversion means (25, 26) connected with said temporary storage means for producing from the stored output digital words a recreated digital waveform; and
    (f) control means (16) responsive to said analyzing means for sampling the recreated digital waveform at different locations, thereby to monitor and display another parameter value.

2. Apparatus as defined in claim 1, wherein said control means comprise phase shift means.

3. Apparatus as defined in claim 2, wherein said phase shift means includes digital counter means (16b) the count of which is indicative of the phase displacement to be obtained relative to a previous sampling position.

4. Apparatus as defined in claim 1, wherein said sampling means includes analog-to-digital converter means (14); wherein said conversion means includes digital-to-analog converter means (25); and further wherein said analyzing and display means includes means (21, 37) for addressing the temporary storage means to read out the stored output digital words at a rate to allow a single video line to be obtained.

5. Apparatus as defined in claim 1, wherein said monitor means includes a random access memory and a microprocessor.

6. A method for monitoring a digital waveform contained in a broad band television video signal, comprising
    (a) sampling the digital information at an integer multiple of the digital bit rate which is above the Nyguist level to produce output digital, words indicative of the samples;
    (b) storing the output digital words;
    (c) analyzing the stored output digital words to produce a value of a given parameter of the digital waveform;
    (d) reconstructing from the stored output digital words a reconstructed digital waveform corresponding to the original digital waveform; and
    (e) sampling the reconstructed waveform at a different location than the initial sampling, thereby to produce a more appropriate value of the given parameter.

* * * * *